United States Patent
Roy et al.

(10) Patent No.: US 12,483,300 B2
(45) Date of Patent: Nov. 25, 2025

(54) METHOD AND APPARATUS FOR CLOSED FORM SINGULAR VALUE DECOMPOSITION ASSOCIATED WITH BEAMFORMING IN WIRELESS NETWORKS

(71) Applicant: NXP USA, Inc., Austin, TX (US)

(72) Inventors: Sayak Roy, Kolkata (IN); Ankit Sethi, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 130 days.

(21) Appl. No.: 18/053,401

(22) Filed: Nov. 8, 2022

(65) Prior Publication Data

US 2024/0106502 A1 Mar. 28, 2024

(30) Foreign Application Priority Data

Sep. 19, 2022 (IN) .............................. 202221053383

(51) Int. Cl.
H04B 7/0456 (2017.01)

(52) U.S. Cl.
CPC .................. *H04B 7/0456* (2013.01)

(58) Field of Classification Search
CPC ........................... H04B 7/0456; H04B 7/0617
See application file for complete search history.

(56) References Cited

U.S. PATENT DOCUMENTS

| 7,895,254 B2 * | 2/2011 | Ketchum | G06F 17/16 |
| | | | 708/520 |
| 8,249,186 B2 | 8/2012 | Koo et al. | |
| 9,325,399 B2 | 4/2016 | Porat et al. | |
| 2007/0268181 A1 * | 11/2007 | Howard | H04L 1/0675 |
| | | | 342/368 |
| 2008/0212461 A1 * | 9/2008 | Pande | H04L 25/0248 |
| | | | 370/203 |
| 2018/0175928 A1 * | 6/2018 | Roy | H04B 7/0417 |
| 2023/0388157 A1 * | 11/2023 | Shikida | H04L 25/0248 |
| 2024/0048196 A1 * | 2/2024 | Caporal Del Barrio | ..... |
| | | | H04B 7/0608 |

OTHER PUBLICATIONS

Qiao et al., "Computing the Singular Values of 2×2 Complex Matrices," McMaster University, Downloaded from http://www.cas.mcmaster.ca/sqrl/papers/sqrl5.pdf on Sep. 19, 2022, published May 2002, 8 pages.

(Continued)

*Primary Examiner* — Sam K Ahn
*Assistant Examiner* — Amneet Singh

(57) ABSTRACT

A beamformee receives a channel coefficient matrix H of a wireless communication channel between a beamformer and the beamformee. The channel coefficient matrix is a 2×N complex matrix having two rows corresponding to two antenna of the beamformee and N columns corresponding to N antenna of the beamformer. A real symmetric matrix M is determined based on the matrix H followed by determining eigenvalues and eigenvectors of matrix M. Singular vectors of the matrix H based on the eigenvectors are determined where the singular vectors define a steering matrix. The steering matrix is transmitted to a beamformer, wherein a beam is steered by the beamformer to the beamformee based on the steering matrix.

18 Claims, 7 Drawing Sheets

(56) References Cited

OTHER PUBLICATIONS

Wikipedia, "Square root of a 2 by 2 matrix," downloaded Sep. 21, 2022 from https://en.wikipedia.org/wiki/Square_root_of_a_2_by_2_matrix, 4 pages.
Lyons, Richard G, "Understanding Digital Signal Processing", section 13.2, Prentice Hall, 2004, ISBN 0-13-108989-7, 684 pages.
J Blinn, "Consider the Lowly 2×2 Matrix", in IEEE Computer Graphics and Applications, vol. 16, No. 2, pp. 82-88, Mar. 1996.
Hogben & Rosen, "Handbook of Linear Algebra," Chapter 45, Handbook of Linear Algebra, Chapman & Hall/CRC Press, 2006, 22 pages.
Schmidt, Drew, "A Survey of Singular Value Decomposition Methods for Distributed Tall/Skinny Data," 2020 IEEE/ACM 11th Workshop on Latest Advances in Scalable Algorithms for Large-Scale Systems (ScaIA), 8 pages.
Demmel et al., "Accurate Singular Values of Bidiagonal Matrices," Siam J. Sci. Stat. Comput., v. 11, n. 5, pp. 873-912, 1990.
Golub et al., "Calculating the singular values and pseudo-inverse of a matrix," J. Siam Numer., Anal, Ser. B, vol. 2, No. 2, Printed in U.S.A., 1965, 20 pages.
Li et al., "On Robust Capon Beamforming and Diagonal Loading," IEEE Transactions on Signal Processing, vol. 51, No. 7, Jul. 2003, 14 pages.
Lorenz et al., "Robust Minimum Variance Beamforming," IEEE Transactions on Signal Processing, vol. 53, No. 5, May 2005, 13 pages.

\* cited by examiner

METHOD AND APPARATUS FOR CLOSED FORM SINGULAR VALUE DECOMPOSITION ASSOCIATED WITH BEAMFORMING IN WIRELESS NETWORKS

FIELD OF USE

The present disclosure relates generally to wireless networks, and more particularly, to a method and apparatus for closed form singular value decomposition associated with beamforming in wireless networks.

BACKGROUND

Beamforming is implemented in wireless networks to increase energy levels of wireless signals communicated between wireless devices and improve communication reliability. A wireless device that performs beamsteering is referred to as a beamformer, and a wireless device that enables the beamsteering operation by computing a steering matrix from channel measurements and conveying the same to the beamformer, is referred to as a beamformee. Examples of such wireless devices can include an access point, a wireless client (e.g., a mobile device), or the like. To initialize beamforming, the beamformer determines and transmits training sequences to the beamformee. Based on the received training sequences, the beamformee determines a channel coefficient matrix which is then used to generate and transmit a steering matrix to the beamformer for beamforming. The channel coefficient matrix indicates transmission characteristics of a communication channel and the steering matrix indicates a steering direction in which streams should be transmitted from a beamformer to a beamformee to result in strong received signals by the beamformee. Typically, the beamformee includes a processing circuit to determine the steering matrix that is transmitted to the beamformer. The steering matrix is determined by a singular value decomposition (SVD) process of the channel coefficient matrix. The singular value decomposition is a factorization of a rectangular real or a complex matrix and is a computationally intensive iterative operation.

BRIEF DESCRIPTION OF THE DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

Example Systems

Figure 1:
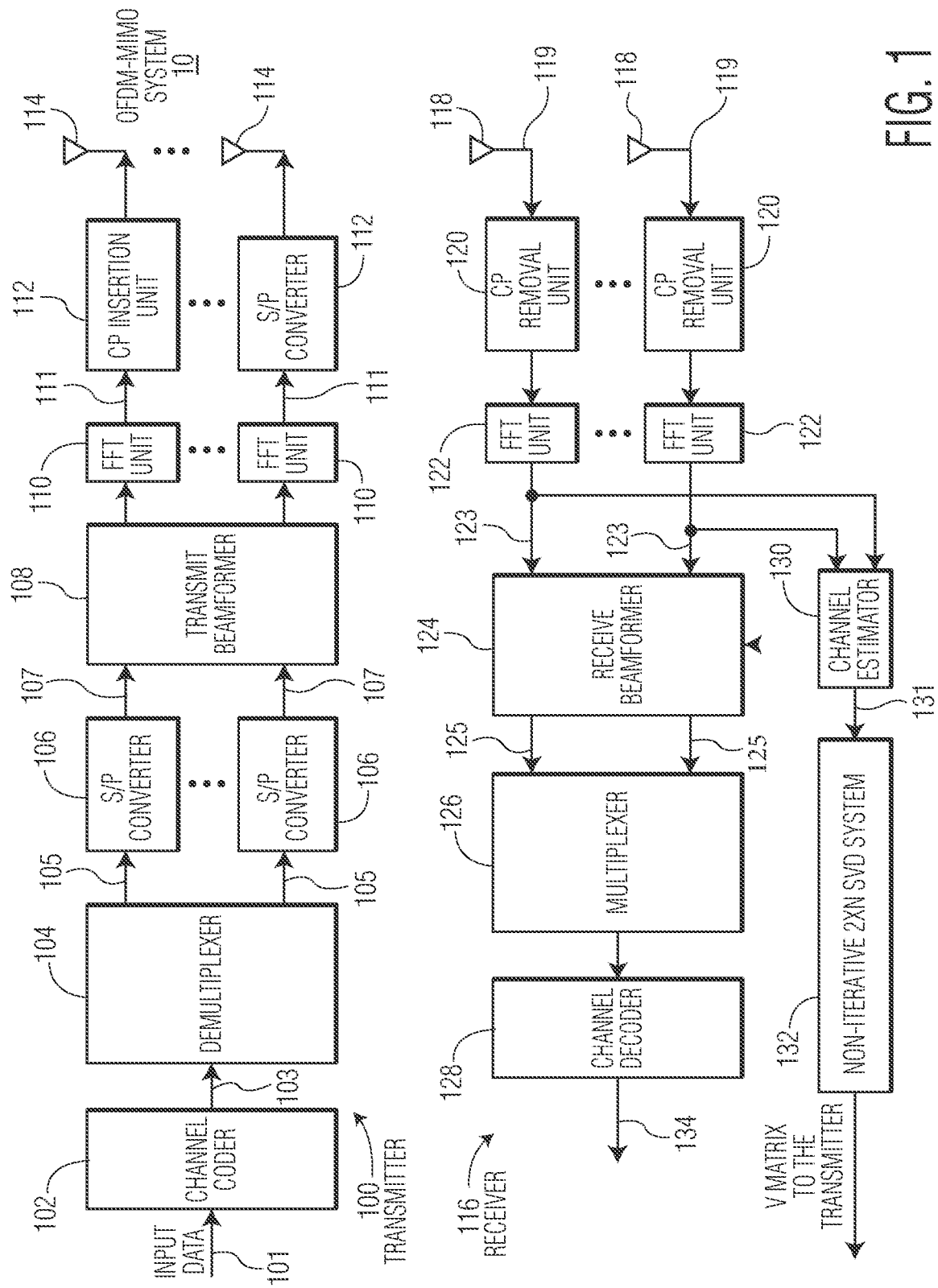
FIG. 1 is an example simplified block diagram of a wireless communication system including a transmitter and a receiver implementing beamforming using singular value decomposition (SVD) in accordance with an embodiment.

FIG. 1 is an example simplified block diagram of a wireless communication system including a transmitter 100 and a receiver 116 implementing beamforming using singular value decomposition (SVD) in accordance with an embodiment. It should be noted that the system shown in FIG. 1 is provided as an example, not as a limitation, and embodiments are applicable to any wireless communication system where SVD is to be performed. The transmitter 100 includes a channel coder 102, a demultiplexer 104, a plurality of serial-to-parallel (S/P) converters 106, a transmit beamformer 108, a plurality of inverse fast Fourier transform (IFFT) units 110, cyclic prefix (CP) insertion units 112 and a plurality of transmit antennas 114. The channel coder 102 encodes input data 101 to produce an encoded data stream 103 which is then parsed into N serial data streams 105 by the demultiplexer 104. N is the number of transmit antennas 114. The S/P converters 106 may convert each serial data stream 105 to parallel streams 107. The parallel streams 107 are then processed by the transmit beamformer 108. The transmit beamformer 108 performs a transmit precoding on symbols of the parallel stream. The precoding results in the transmitted symbols transmitted as a stream in the directions where the transmitted symbol will be received with a highest strength. The IFFT units 110 convert the symbols into time-domain data streams 111 and a CP is inserted in each time domain data stream 111 by each of the CP insertion units 112. The time-domain data streams 111 with CP is then transmitted through respective ones of the transmit antennas 114.

The receiver 116 includes a plurality of receive antennas 118, CP removal units 120, FFT units 122, a receive beamformer 124, a multiplexer 126, a channel decoder 128, and a channel estimator 130. The CP is removed from received signals 119 by the CP removal units 120 and processed by the FFT units 122 to be converted to frequency domain data streams 123. The receive beamformer 124 processes the frequency-domain data streams 123. Each output 125 of the receive beamformer 124 is then multiplexed by the multiplexer 126 and decoded by the channel decoder 128, which determines a decoded data stream 134. The channel estimator 130 determines a channel coefficient matrix of a channel between the transmitter 100 and receiver 116 preferably from training sequences transmitted by the transmitter 100 via each transmit antenna 114 and received by a corresponding receive antenna 118. The channel coefficient matrix represents one or more of an attenuation, phase shift, and noise applied to a signal transmitted by the transmitter 100 and received by the receiver 116. A number of rows of the channel coefficient matrix may equal a number of receive antenna which in this case is shown as two and a number of columns of the channel coefficient matrix may equal a number of transmit antenna. Each entry in the channel coefficient matrix may be a channel coefficient which indicates an effect of the channel on a signal transmitted by an antenna 114 of the transmitter 100 and received by an antenna 118 of the receiver 116 at a particular frequency.

The channel estimator 130 may typically provide the channel coefficient matrix represented by signal 131 to a singular value decomposition (SVD) system. The SVD system may perform the SVD of the channel coefficient matrix referred to as H to compute V, Λ, and U matrices of the channel. The SVD of the coefficient matrix H is H=UΛV$^{(h)}$ where U and V are matrices of vectors and Λ defines singular values. Further, column vectors of V may be referred to as right singular vectors which indicate steering directions of an electromagnetic beam (as referred to herein as a stream) transmitted from a beamformer to a beamformee where transmitted symbols may be received with a highest strength in orthogonal streams. The singular values in the Λ matrix identify a respective strength of the directions of transmission analogous to a signal-to-noise for the directions. In an example, one or more of the V and Λ matrices may be transmitted from the receiver 116 to the transmitter 100.

The transmitter 100 may transmit Vx to the receiver 116 where x is a vector comprising as elements streams (e.g., one or more symbols) to be transmitted and Vx steers the streams in certain directions. The transmitter 100 may also use the Λ matrix to determine a modulation and coding scheme of the streams transmitted to the receiver 116. A signal represented by Vx passes through the "raw" channel, represented by the matrix H, which results in the receiver receiving a signal y=HVx+n (n is receiver noise) and may be rewritten as y=(UΛV$^H$)Vx+n=UΛ(V$^H$V)x+n=UΛx+n. Further, the beamformee may remove the matrix U by a pre-multiplication: ŷ=U$^H$y+U$^H$n=(U$^H$U)Λx+U$^H$n=Λx+n̂, where n̂=U$^H$n. Λ is a diagonal matrix. Hence, $ŷ_1=Λ_{11}x_1$, $ŷ_2=Λ_{22}x_2$, ... and so on. This shows that the streams (i.e. the elements of the vector x), are decoupled at the receiver, and hence don't interfere with each other. Further, the elements of the diagonal matrix Λ are singular values of the matrix H. These elements are sorted in descending order (i.e. $Λ_{11} ≥ Λ_{22} ≥ Λ_{33} ≥$ ...). Hence the first stream (i.e. $x_1$) sees the largest possible channel gain, i.e. $Λ_{11}$. The second stream sees the next best possible channel gain ($Λ_{22}$) and so on. In this manner, the singular vectors and singular values facilitate steering of the streams.

Typical algorithms for computing SVD employ eigenvalue decomposition of square matrices to compute the right singular vectors of the channel coefficient matrix H. The right singular vectors may be computed by forming an intermediate matrix B=H$^H$H and thereafter eigenvalue decomposition is performed on the matrix B to determine the right singular vectors based on an iterative computation. H may have a condition number. The condition number may be based on a ratio of a largest singular value to a smallest singular value of the matrix H. In some examples, H may be ill conditioned and have a high condition number when there is a disparity in magnitude between singular values of the matrix and a beamformer and beamformee are located nearby each other. When H has a high condition number, B will have even higher condition number because the condition number of B equals the squared condition number of H. The higher condition number of B further indicates a disparity in magnitude between singular values of B increasing chances of saturation or truncation during the determination of the eigenvectors of B and numerical instability where calculated eigenvectors diverges from actual eigenvectors.

Embodiments disclosed herein are directed to an alternative SVD computation by the receiver 116 which is non-iterative and numerically stable on the H matrix. The receiver 116 may have a non-iterative 2×N SVD system 132 to perform this SVD. The non-iterative 2×N SVD system 132 may receive an H matrix which is a 2×N matrix and perform an eigenvalue decomposition of H based on computing a 2×2 real symmetric matrix through orthogonal transformations of H and then perform a closed form eigenvalue decomposition of the 2×2 real symmetric matrix to determine the one or more of the V matrix and the Λ matrix of the SVD which are then transmitted from the receiver 116 to the transmitter 100 and used by the transmitter 100 to steer a stream in a direction indicated by the V matrix from the transmitter 100 to the receiver 116. The 2×2 real symmetric matrix which is used to determine the V matrix and singular values of the SVD provides same results as the eigenvalue decomposition of B but in a closed form solution rather than an iterative solution and reduces the numerical instabilities if H is an ill conditioned channel coefficient matrix. A condition number reduction of H may also be performed to handle ill conditioned channel coefficient matrices and improve numerical stability to reduce discontinuities in transmitted beams over an angular range which might otherwise be present.

Figure 2:
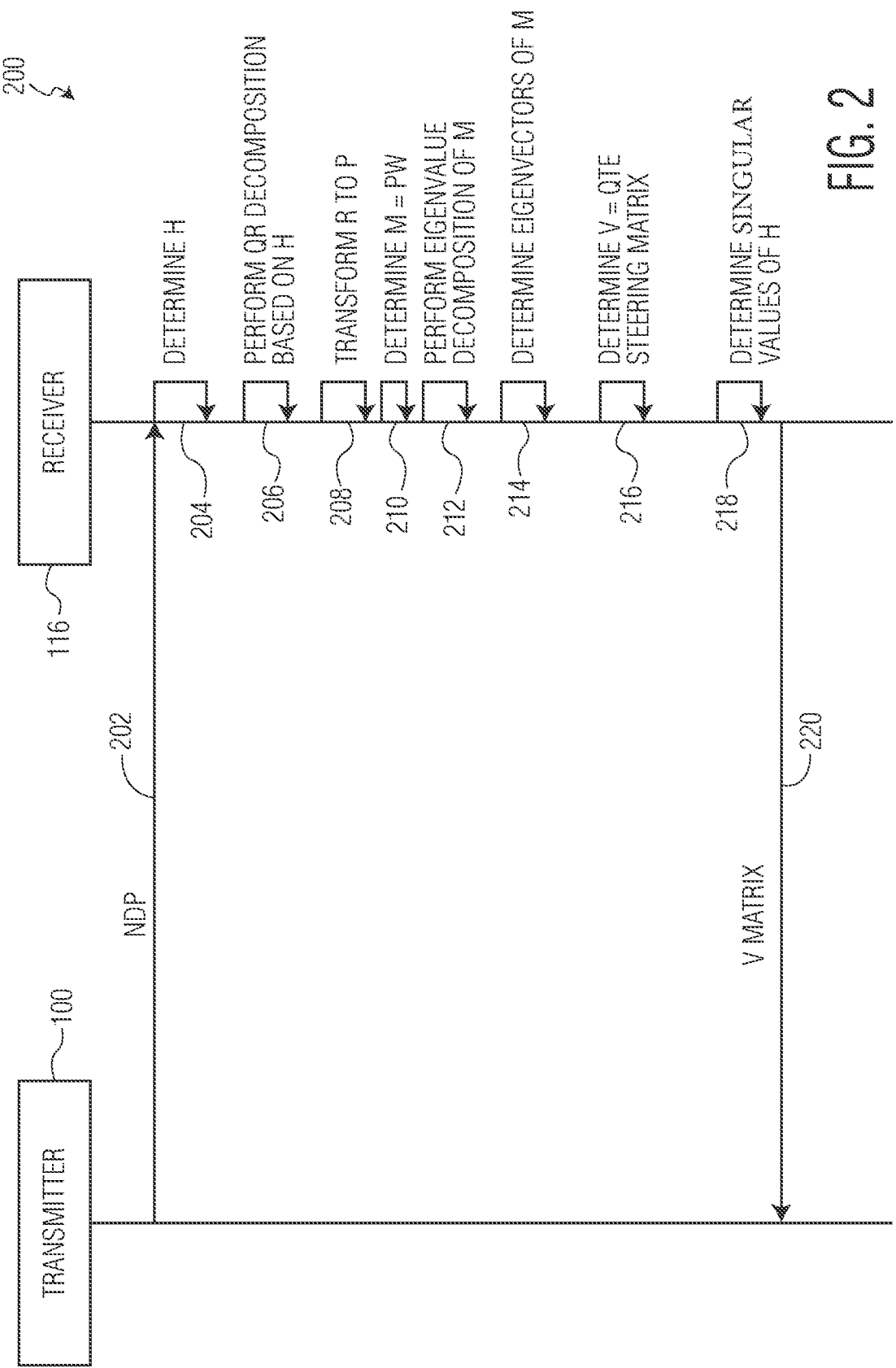
FIG. 2 is an example sequence diagram that illustrates beamforming between a beamformer and a beamformee of the wireless network based on the SVD in accordance with an embodiment.

FIG. 2 is an example sequence diagram 200 that illustrates beamforming between the transmitter 100 and receiver 116 of the wireless network based on the SVD in accordance with an embodiment. In an example, the transmitter 100 may be referred to as a beamformer and the receiver 116 may be referred to as a beamformee.

Referring to FIG. 2, the beamformer may generate a packet such as a null data packet (NDP). The NDP can include a plurality of training fields such as long training fields (LTFs). At 202, the beamformer may then transmit the NDP to the beamformee. The beamformer transmits the NDP to the beamformee to allow the beamformee to generate the channel coefficient matrix and steering matrix for subsequent beamforming to the beamformee.

At 204, the beamformee determines the channel coefficient matrix based on the NDP received from the beamformer. The number of rows and the number of columns of the channel coefficient matrix can be equal to the number of receive antenna and number of transmit antenna of the beamformee and beamformer, respectively. In an example, the channel coefficient matrix may be a 2×N complex matrix with 2 receive antenna and N transmit antenna. The beamformee may execute an SVD operation on the channel coefficient matrix to determine the steering matrix which is then transmitted to the beamformer to steer beams to the beamformee.

At 206, a QR decomposition based on the matrix Z=YH is performed where H is a 2×N complex matrix and Y is any 2×2 orthonormal matrix (If Y=I$_{2×2}$, then Z degenerates to H). An orthonormal matrix is a matrix with columns vectors which are orthogonal and have a norm of one. The Z$^H$ (the Hermitian transpose of the matrix Z) is decomposed into a product of a matrix Q with orthonormal columns and an upper triangular matrix R with real positive diagonals: Z$^H$=QR. R may be a 2×2 matrix with elements $r_{11}$, $r_{12}$, $r_{21}$, $r_{22}$. In an example, the Y matrix may be $$Y = \begin{bmatrix} \cos\theta & -\sin\theta \\ \sin\theta & \cos\theta \end{bmatrix}$$

where a parameter θ is used for tuning an amount of power received at the two antennas in the special case when H has orthogonal rows. Y may distribute streams to both antennas, so that any antenna specific or receiver chain specific issues would only partly impact the received streams when the channel H is close to orthogonal. When H is close to an orthogonal matrix, the disclosed algorithm may choose a V matrix such that HV=I, where I is the identity matrix. This means that when V is used as a steering matrix by a beamformer device (transmitter), the signal received by the receiving device will be such that the first receive antenna will only see the first transmitted stream, while the second receive antenna will only see the second transmitted stream. If one of the receive antennas momentarily sees some interference or some other impairment, then it can cause significant degradations to the corresponding stream. Y ensures is that it distributes both streams to both antennas, so that any antenna specific or receiver chain specific issues would only partly impact the received streams. Y provides a way of distributing the received streams over the receiver antennas when the channel H turns out to be close to orthogonal. If H does not have non-orthogonal rows, the multiplication of H by Y may not result in any tuning.

The QR decomposition facilitates eigenvalue decomposition on the R matrix because the R matrix as a result of the QR decomposition is a square matrix with positive diagonals. Further, the eigenvalues or singular values of H may be calculated by R because Q is an orthonormal matrix and the R is rotated by Q to form H and the eigenvalues or singular values of a matrix do not change based on a rotation.

At 208, R is transformed by applying $P = T^H RT$ where $$T = \begin{bmatrix} 1 & 0 \\ 0 & e^{-j\angle r_{12}} \end{bmatrix} \text{ and } P = \begin{bmatrix} r_{11} & |r_{12}| \\ 0 & r_{22} \end{bmatrix}$$

is a real upper triangular matrix. At 210, P is transformed into a symmetric matrix M. The symmetric matrix M is determined by a post multiplication with an orthonormal matrix $$W = \begin{bmatrix} \cos\phi & -\sin\phi \\ \sin\phi & \cos\phi \end{bmatrix}$$

where $\varphi = \angle((r_{11}+r_{22})+j|r_{12}|)$. So, M=PW is a real symmetric matrix and M is a 2×2 matrix with elements $m_{11}$, $m_{12}$, $m_{21}$, $m_{22}$ where i and j are integers which correspond to a row and column of M.

At 212, an eigenvalue decomposition of M is performed. Because M is a real symmetric matrix, the eigenvalue decomposition of M results in eigenvalues which are the same as singular values as which would result from the SVD of H. The eigenvalue decomposition may be based on a closed form solution. At 214, eigenvalues of M may be computed based on quantities $$u = \frac{(m_{11} + m_{22})}{2} \text{ and } v = \frac{(m_{11} - m_{22})}{2} + jm_{12}.$$

The eigenvalues of M may be computed as: $\lambda_{min}=u-|v|$, and $\lambda_{max}=u+|v|$. In some examples, the $|v|$ calculation which is a magnitude of a complex number may be approximated by a linear operation.

In an example, the eigenvalue resulting from the eigenvalue decomposition of M is equal to the singular values of M resulting from an SVD because the matrix M is always positive semidefinite. The matrix M may be always positive semidefinite because the upper triangular matrix R has positive diagonals. Further, the matrix M may always be positive semidefinite and P is upper triangular having same diagonal elements as R, and hence positive semidefinite.

At 214, the eigenvectors of M is determined. The computation may be a two-step process where a regularized angle is computed followed by using the regularized angle to compute the eigenvectors. The regularized angle may be an angle which is computed as $$\psi = \frac{\angle(v + \alpha\xi(\lambda_{min}, \lambda_{max}))}{2}$$

where a regularization function is $\xi: (\mathbb{R}_{\geq 0}, \mathbb{R}_{\geq 0}) \to [0,1]$ which is a real positive function, monotonically increasing in the first argument and monotonically decreasing in the second argument. (e.g. one may choose the specific form:

$$\xi(x, y) = \frac{x^m}{y^n},$$

where m, n ∈ $\mathbb{R}_{>0}$) and α is a tunable constant to have an additional control over the regularization. In other examples, the regularization function may be a function of $r_{11}$, $r_{22}$ and/or $r_{12}$ instead of $\lambda_{min}$ and $\lambda_{max}$. An example of such a regularization function may be $$\zeta(r_{11}, r_{22}, r_{12}) = \frac{(|r_{11} + r_{22} - |r_{12}||)^m}{(r_{11} + r_{22} + |r_{12}|)^n}$$

where m, n ∈ $\mathbb{R}_{>0}$. Based on ψ, the eigenvectors of M may be computed as:

$$E = \begin{bmatrix} \cos\psi & -\sin\psi \\ \sin\psi & \cos\psi \end{bmatrix}.$$

The regularization function and regularized angle resulting from the regularization function may force E to be an identity matrix as conditioning of H improves which indicates that a strongest direction of transmission is uniform over various directions.

At 216, right singular vectors of H which is a 2×N matrix is determined based on the SVD decomposition $H=U \Lambda V^{(h)}$. The right singular vectors may be column vectors of the V matrix. The matrix of the right singular vectors of H is given by V=QTE derived from the SVD equation for H and equations for P and M above. V comprises the vectors $v_1$ and $v_2$.

At 218, the singular values of H is determined as $\sigma_1=\|Hv_1\|$ and $\sigma_2=\|Hv_2\|$.

At 220, the beamformee transmits the steering matrix V to the beamformer to implement beamsteering between the beamformer and the beamformee. One or more streams may be steered in directions based on the steering matrix V from the beamformer to the beamformee. In some examples, the Λ matrix may also be transmitted to the beamformer. In an example, elements of the Λ matrix may indicate a signal-to-noise ratio of the streams steered in a particular direction. The beamformer may use the Λ matrix to determine a modulation and coding scheme for a respective stream which is transmitted to the beamformee.

The scope of the present disclosure is not limited to the beamformee determining the steering matrix in the above-described manner. In various other embodiments, the beamformee may determine the steering matrix differently as compared to that described above.

For example, in some examples, a condition number reduction may be performed where a matrix $F=M+\rho I_{2\times 2}$ is computed. The matrix F may be positive semidefinite and M may be positive semidefinite for any value of $\rho$. Further F and M have same eigenvectors). In one example, $\rho$ can be e.g. $\sqrt{\det(M)}$ in which case F will correspond to the square root of the matrix M up to a scaling factor). In another example, $\rho$ may be e.g.

$$\frac{(\gamma+1)}{(\gamma-1)}|s| - t,$$

where $\gamma$ is a target condition number for F, $$s = \frac{(m_{11}+m_{22})}{2} \text{ and } t = \frac{(m_{11}-m_{22})}{2} + jm_{12}.$$

$jm_{12}$. The steps above may be performed by replacing M with F.

In another example, the quantity $\angle r_{12}$ may have any random value when $r_{12}$ is close to 0. In some implementations, after step 208, one can check if $\max(|\text{Re}(r_{12})|, |\text{Im}(r_{12})|)<\text{Th}\times\min(r_{11}, r_{22})$, where Th is a small programmable threshold (e.g. $1^{e-3}$). If this condition evaluates to True, then the beamformee may output $U=I_{2\times 2}$, $V=Q$, $\sigma_1=r_{11}$, $\sigma_2=r_{22}$ where I is an identity matrix. In other examples, the check condition may have many other different forms such as e.g., $\max(|\text{Re}(r_{12})|, |\text{Im}(r_{12})|)<\text{Th}\times r_{11}$ or $\max(|\text{Re}(r_{12})|, |\text{Im}(r_{12})|)<\text{Th}\times r_{22}$, or $\max(|\text{Re}(r_{12})|, |\text{Im}(r_{12})|)<\text{Th}\times\max(r_{11},r_{22})$ or $\max(|\text{Re}(r_{12})|, |\text{Im}(r_{12})|)<\text{Th}$ etc. Some implementations may use a combination of these conditions. Others may use some altogether different check conditions involving $r_{11}, r_{22}$, and $r_{12}$.

When condition number is not much of a concern (i.e. when H is known to be fairly well conditioned), $B=HH^H$ may be computed followed by step 210 performed on B to obtain $M=T^H BT$ where $$T = \begin{bmatrix} 1 & 0 \\ 0 & e^{-j\angle b_{12}} \end{bmatrix},$$

such that M becomes a real symmetric matrix. Thereafter steps 212, 214 may be performed to obtain the matrix E and form the matrix $U=TE$. Subsequently, $\hat{V}=H^H U$ is computed. Normalization of the columns of $\hat{V}$ provides the right singular vectors of the H matrix and the column norms of $\hat{V}$ correspond to the singular values of H (i.e. $\sigma_1$ and $\sigma_2$ respectively). Further, a compressed steering matrix (CSM) may be determined based on directly performing a QR decomposition of $\hat{V}$. In that case, the Q matrix corresponds to the right singular vectors of H, the phase and Givens angles corresponding to the Q matrix comprise the CSM, and the diagonal entries of the R matrix correspond to the singular values of H.

Example Methods

Figure 3:
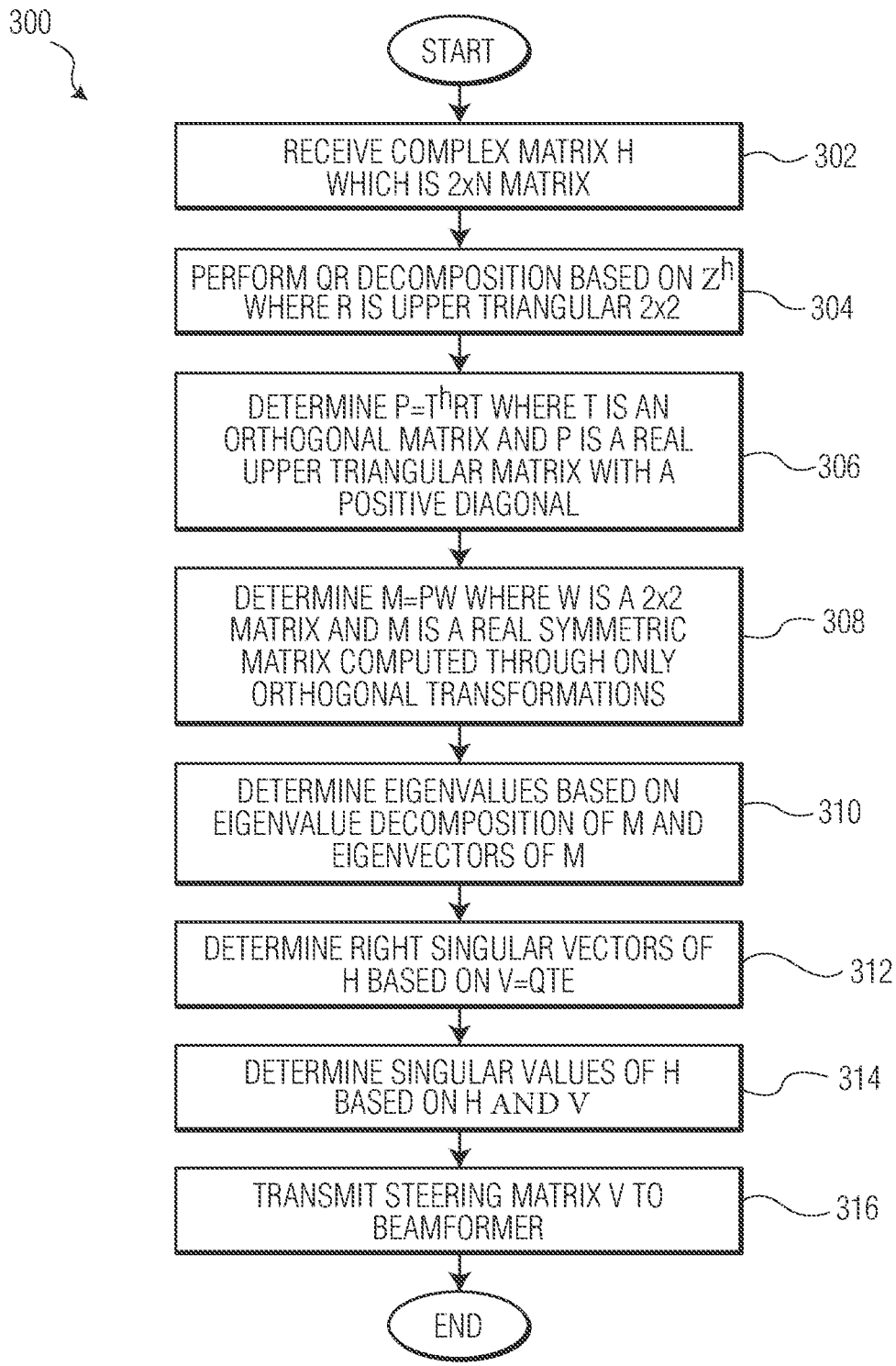
FIG. 3 is an example flowchart that illustrates a beamforming method in accordance with an embodiment.

FIG. 3 represents an example flowchart 300 that illustrates a beamforming method in accordance with an embodiment. The beamforming method may correspond to implementing beamforming between the transmitter 100 and the receiver 116 in the wireless network 100.

At 302, a beamformee may receive a 2×N complex matrix H. The matrix H may be determined based on a training sequence transmitted by the beamformer in a NDP and received by the beamformee. The complex matrix H may have two rows corresponding to the two receive antenna of the beamformee and N columns corresponding to the N transmit antenna of the beamformer. At 304, a QR decomposition of the Hermitian transpose of Z may be performed. In an example, Q is a N×2 matrix having orthogonal columns and R is a 2×2 upper triangular matrix with a real positive diagonal. At 306, the R matrix may be transformed so that non-diagonal entries become real. The R matrix may be modified to be a P matrix based on $P=T^H RT$ where T is an orthogonal matrix and P is a real upper triangular matrix with a positive diagonal. At 308, the matrix P may be transformed into a real symmetric matrix M. The matrix $M=PW$ where W is a 2×2 matrix and M is a real symmetric matrix computed through only orthogonal transformations. The matrix M is then decomposed based on a closed form non-iterative eigenvalue decomposition problem of the 2×2 intermediate real symmetric matrix. At 310, the eigenvalues and the eigenvectors of M may be determined. E may be a matrix formed with the eigenvectors as columns. At 312, right singular vectors of H is determined based on $V=QTE$. At 314, singular values of H is determined based on the H and the right singular vectors of H. The singular values may be computed as a norm of H and a vector of the right singular vectors. At 316, the steering matrix V is transmitted to the beamformer and used to steer one or more streams in directions defined by the V matrix from the beamformer to the beamformee. In some examples, the A matrix may also be transmitted to the beamformer to select a modulation and coding scheme for a respective stream which is transmitted.

FIGS. 4A-4E illustrates various plots illustrating performance of the SVD in accordance with embodiments. The plots show comparison of quality of singular values and channel continuity for the disclosed SVD compared to a baseline power iteration based SVD method with 10 iterations.

Figure 4A:
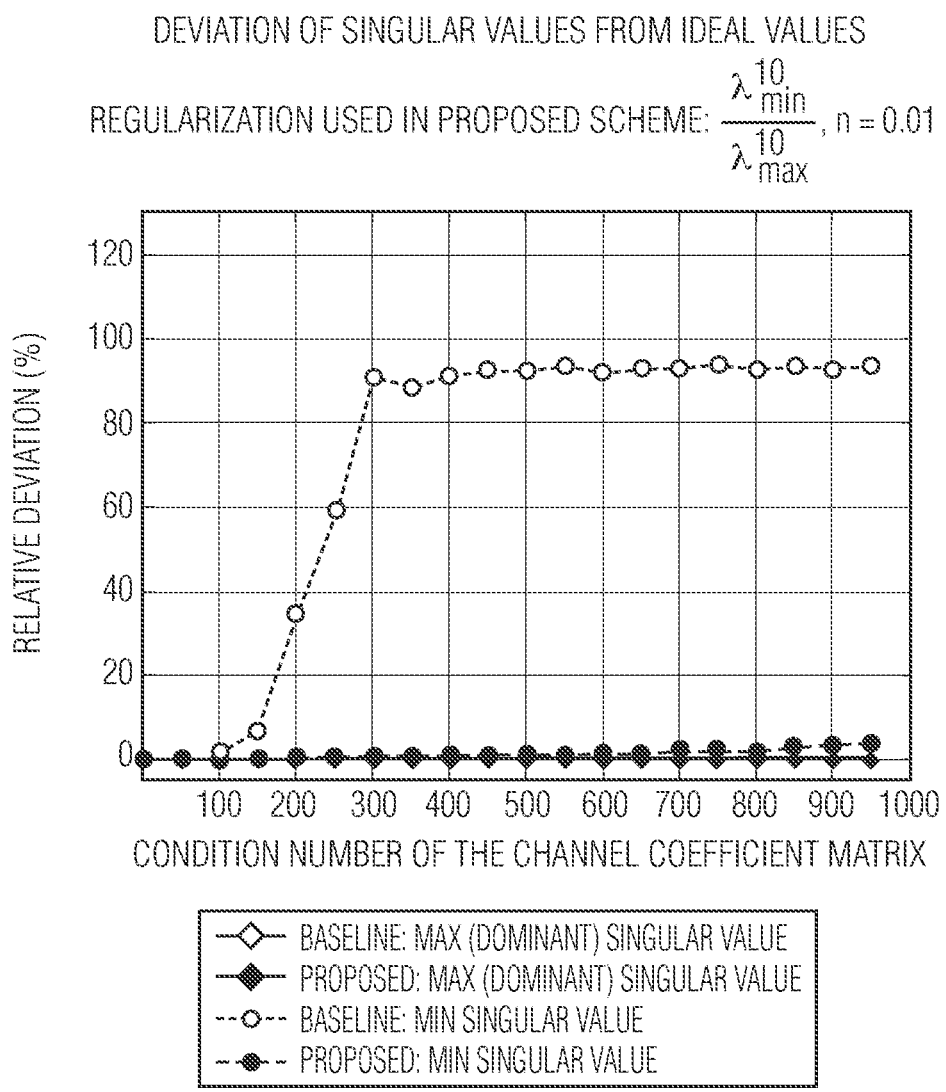
FIGS. 4A-4E illustrate various plots illustrating performance of the SVD in accordance with an embodiment.

FIG. 4A shows a comparison of the minimum and maximum singular values determined based on the disclosed SVD compared to the singular values determined by a baseline power iteration based SVD with 10 iterations. Deviations of the estimated singular values from ideal values computed using the singular vectors (as $\sigma_i = \|Hv_i\|$) are shown. The plot shows that the baseline has excellent accuracy for a maximum singular value, but poor accuracy for a minimum singular value at higher condition numbers. The disclosed SVD outputs highly accurate minimum singular vectors even at very high condition numbers.

Figure 4B:
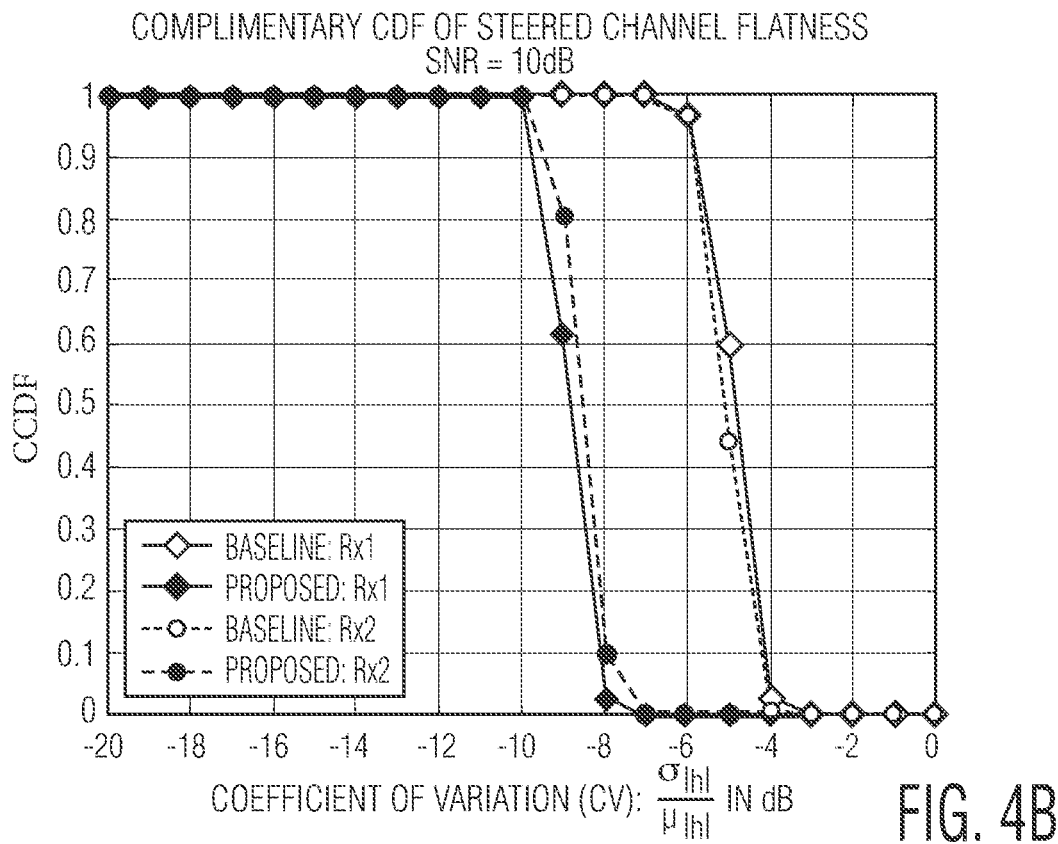
Figure 4C:
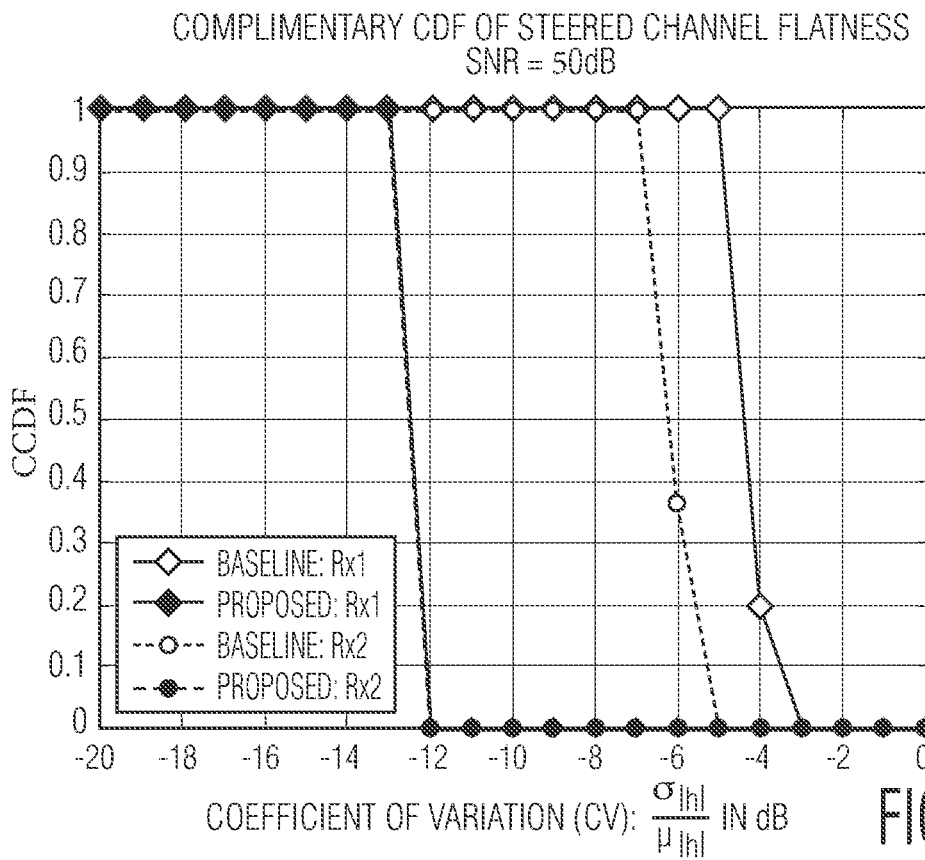

FIGS. 4B-4C show a coefficient of variation (CV) of a steered channel matrix based on the disclosed SVD as a complementary cumulative distribution function (CCDF) for a signal-to-noise ratio (SNR) of 10 dB and 50 dB, respectively. The CV is indicative of a continuity of signals transmitted over the channel across contiguous frequency tones. Each frequency tone defines a frequency range of subcarriers to transmit symbols and has a corresponding channel coefficient matrix. The channel coefficient matrix and corresponding steering matrix determined by the disclosed SVD may define the steered channel matrix. A variation in magnitude of the steered channel matrix over contiguous frequency tones is indicative of the channel continuity. Ideally, the variation in magnitude from a mean steered channel matrix is to be small. At a high SNR of 50 dB, CV is no more than −12 dB for the steered channel matrices obtained using the proposed scheme, whereas almost all steered channel matrices determined by the baseline scheme have CV greater than −8 dB. Even at an SNR of 10 dB, the proposed scheme has CV below −8 dB whereas the baseline scheme has CV greater than −7 dB. Hence the proposed scheme results in a significantly flatter steered channel matrices across tones as compared to the baseline scheme.

The channel continuity may be indicated by a frequency correlation instead of a magnitude flatness.

Figure 4D:
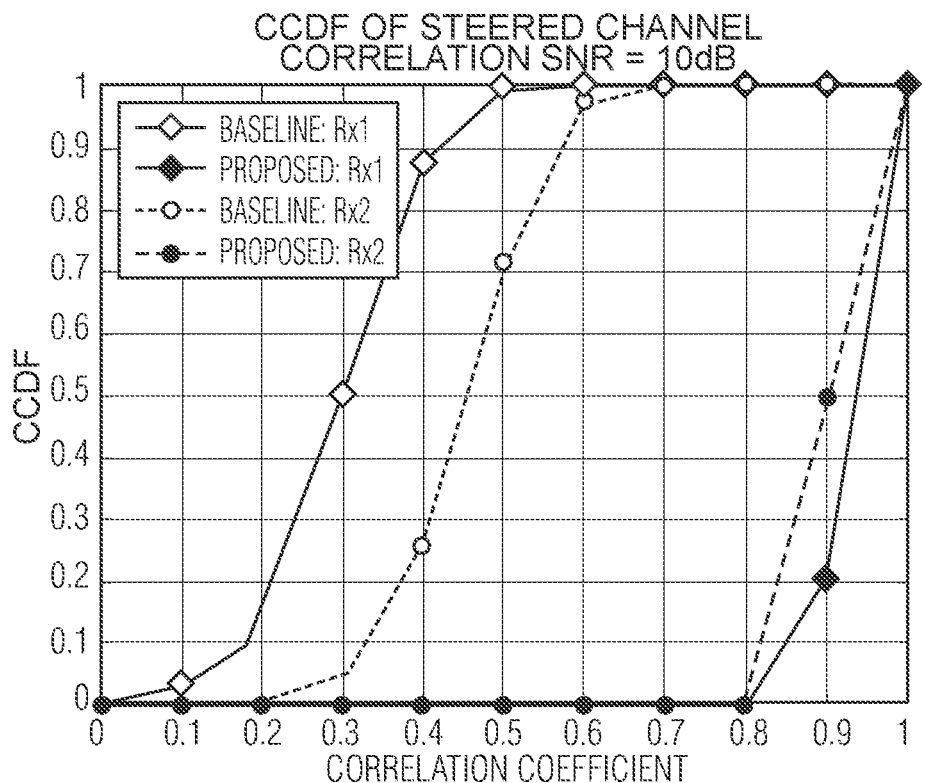
Figure 4E:
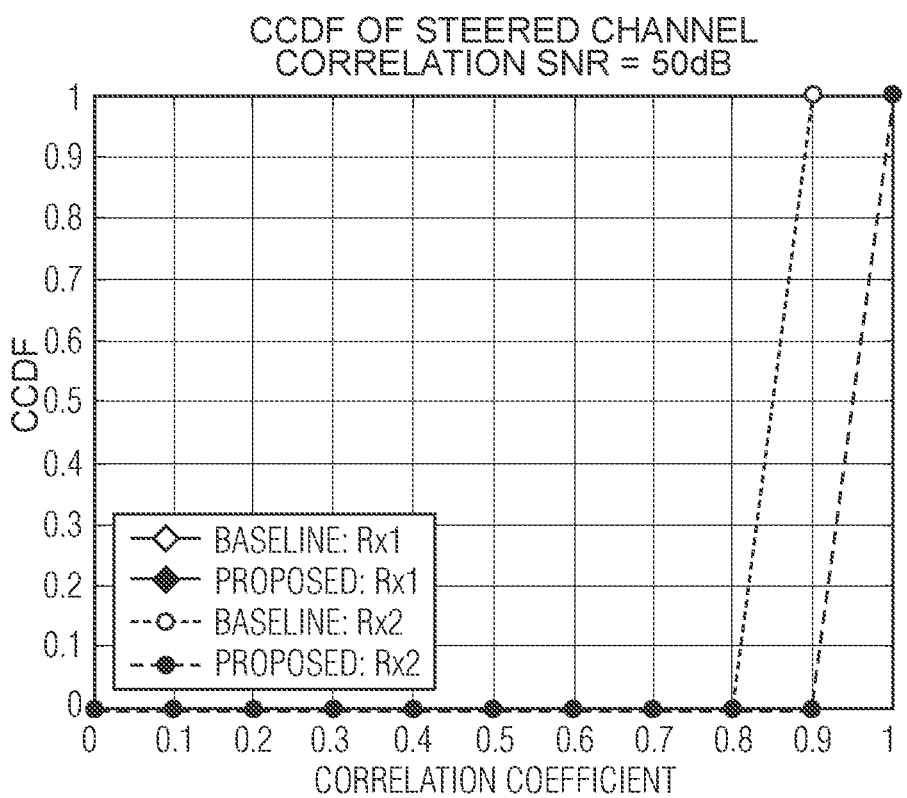

FIGS. 4D-4E show a frequency correlation of a steered channel matrix based on the disclosed SVD as a CCDF for a signal-to-noise (SNR) of 10 dB and 50 dB, respectively. The plots show that the proposed scheme produces steered channel matrices with very high correlation (>0.8) across adjacent tones even at low SNR level of 10 dB, whereas the baseline scheme degrades the steered channel matrices significantly at low SNR. Hence the proposed scheme results in closer correlated steered channel matrices across tones compared to the baseline scheme.

Example Apparatus

Figure 5:
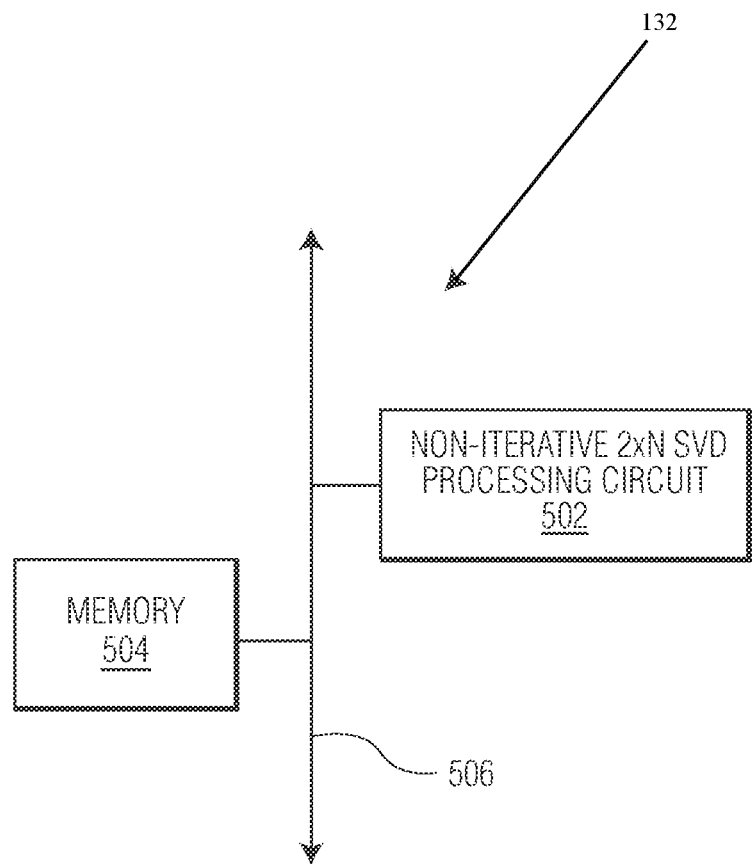
FIG. 5 is an example arrangement of a non-iterative 2×N SVD system which performs the SVD in accordance with an embodiment.

FIG. 5 is an example arrangement of the non-iterative 2×N SVD system 132 which performs the SVD in accordance with an embodiment. The system 132 comprises a non-iterative 2×N processing circuit 502 (possibly including logic circuitry, hardware, multiple processors, multiple cores, multiple nodes, and/or implementing multi-threading, etc.) and memory 504 such as system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium. In some examples, the memory 504 may store computer code, program instructions, computer instructions, program code associated with performing the non-iterative SVD as described herein which is executable by the processing circuit 502. Interconnect 506 such as a bus (e.g., PCI, ISA, PCI-Express) may couple the processor 502 and the memory 504. The SVD as disclosed allows for performing a closed form SVD of a 2×N complex matrix such as a coefficient channel matrix H for beamforming and other applications to reduce computation time of the SVD and is less sensitive to numerical instability when H is ill conditioned, among other advantages.

In an embodiment, a method for steering a beam is disclosed. The method comprises: receiving a channel coefficient matrix H of a wireless communication channel between a beamformer and beamformee, the channel coefficient matrix H being a 2×N complex matrix having two rows corresponding to two antenna of the beamformee and N columns corresponding to N antenna of the beamformer; determining a real symmetric matrix M based on the matrix H; determining eigenvalues and eigenvectors of the matrix M; determining singular vectors of the matrix H based on the eigenvectors and eigenvalues, the singular vectors defining a steering matrix; and transmitting the steering matrix to a beamformer, wherein the beam is steered by the beamformer to the beamformee based on the steering matrix. In an example, determining the real symmetric matrix M is based only on orthogonal transformations of the channel coefficient matrix. In an example, determining eigenvalues and eigenvectors of matrix M comprises performing a non-iterative eigenvalue decomposition of the matrix M. In an example, determining eigenvalues and eigenvectors of matrix M comprises determining a regularized angle to compute the eigenvectors. In an example, a regularization function for determining the regularized angle is based on a function of the eigenvalues. In an example, the method further comprises tuning an amount of power received at the two antenna of the receiver when matrix H has orthogonal rows, the tuning based on a matrix Y multiplied with H, wherein Y is an 2×2 orthonormal matrix. In an example, the method further comprises reducing a condition number of the matrix M. In an example, the method further comprises determining a real upper triangular matrix P based on an upper triangular matrix R, wherein M is based on P and R. In an example, the method further comprises performing a QR decomposition based on H, wherein the QR decomposition is a factorization as a product of a matrix Q with orthonormal columns and an upper triangular matrix R with a real positive diagonal; and wherein determining the real symmetric matrix M comprises determining the matrix M based on the matrix R. In an example, the method further comprises performing a QR decomposition of the steering matrix to determine a compressed steering matrix which is represented by the Q matrix.

In another embodiment, a beamformee is disclosed. The beamforee comprises a processing circuit configured to receive a channel coefficient matrix H of a wireless communication channel between a beamformer and beamformee, the channel coefficient matrix being a 2×N complex matrix having two rows corresponding to two antenna of the beamformee and N columns corresponding to N antenna of the beamformer; determine a real symmetric matrix M based on the matrix H; determine eigenvalues and eigenvectors of the matrix M; determine singular vectors of the matrix H based on the eigenvectors and eigenvalues, the singular vectors defining a steering matrix; and transmit the steering matrix to a beamformer, wherein a beam is steered by the beamformer to the beamformee based on the steering matrix. In an example, the processing circuit configured to determine the real symmetric matrix M is based only on orthogonal transformations of the channel coefficient matrix. In an example, the processing circuit configured to determine eigenvalues and eigenvectors of matrix M comprises the processing circuit configured to perform a non-iterative eigenvalue decomposition of the matrix M. In an example, the processing circuit configured to determine eigenvalues and eigenvectors of matrix M comprises the processing circuit configured to determine a regularized angle to compute the eigenvectors. In an example, the processing circuit is configured to determine the regularized angle based on a function of the eigenvalues. In an example, the processing circuit is further configured to tune an amount of power received at the two antenna of the receiver when matrix H has orthogonal rows based on a matrix Y multiplied with H, wherein Y is an 2×2 orthonormal matrix. In an example, the processing circuit is further configured to reduce a condition number of the matrix M. In an example, the processing circuit is further configured to determine a real upper triangular matrix P based on an upper triangular matrix R, wherein M is based on P and R. In an example, the processing circuit is further configured to perform a QR decomposition based on H, wherein the QR decomposition is a factorization as a product of a matrix Q with orthonormal columns and an upper triangular matrix R with a real positive diagonal; and wherein the processing circuit configured to determine the real symmetric matrix M comprises the processing circuit further configured to determine the matrix M based on the upper triangular matrix R. In an example, the steering matrix is the Q matrix when one or more off diagonal entries of the R matrix are less than a threshold amount.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. Other implementations fall within the scope of the following claims.

What is claimed is:

1. A method for steering a beam, the method comprising:
receiving a channel coefficient matrix H of a wireless communication channel between a beamformer and beamformee, the channel coefficient matrix H being a 2×N complex matrix having two rows corresponding to two antenna of the beamformee and N columns corresponding to N antenna of the beamformer, N being a positive integer number greater than or equal to 1;
determining a real symmetric matrix M based on the channel coefficient matrix H, wherein the real symmetric matrix M has only entries of real numbers;
determining eigenvalues and eigenvectors of the real symmetric matrix M;
determining singular vectors of the channel coefficient matrix H based on the eigenvectors and eigenvalues, the singular vectors defining a steering matrix; and
transmitting the steering matrix to a beamformer, wherein the beam is steered by the beamformer to the beamformee based on the steering matrix, wherein determining the real symmetric matrix M is based only on orthogonal transformations of the channel coefficient matrix H.

2. The method of claim 1, wherein determining eigenvalues and eigenvectors of the real symmetric matrix M comprises performing a non-iterative eigenvalue decomposition of the real symmetric matrix M.

3. The method of claim 1, wherein determining eigenvalues and eigenvectors of the real symmetric matrix M comprises determining a regularized angle to compute the eigenvectors, the regularized angle based on a real positive monotonic regularization function.

4. The method of claim 3, wherein a regularization function for determining the regularized angle is based on a function of the eigenvalues.

5. The method of claim 1, further comprising tuning an amount of power received at the two antenna of the beamformee-receiver when the channel coefficient matrix H has orthogonal rows, the tuning based on a matrix Y multiplied with the channel coefficient matrix H, wherein the matrix Y is an 2×2 orthonormal matrix.

6. The method of claim 1, further comprising reducing a condition number of the real symmetric matrix M.

7. The method of claim 1, further comprising determining a real upper triangular matrix P based on an upper triangular matrix R, wherein the real symmetric M-matrix M is based on the real upper triangular matrix P matrix and the upper triangular matrix R matrix.

8. The method of claim 1, further comprising performing a QR decomposition of a Hermitian transpose of a matrix Z, wherein the matrix Z is based on the channel coefficient matrix H and a matrix Y, the matrix Z degenerates to the channel coefficient matrix H when the matrix Y is an identity matrix, wherein the QR decomposition is a factorization as a matrix Q with orthonormal columns and an upper triangular matrix R with a real positive diagonal; and wherein determining the real symmetric matrix M comprises determining the real symmetric matrix M based on the upper triangular matrix R.

9. The method of claim 1, further comprising performing a QR decomposition of the steering matrix to determine a compressed steering matrix which is based on a matrix Q matrix corresponding to right singular vectors of the channel coefficient matrix H.

10. A beamformee comprising:
a processing circuit configured to:
receive a channel coefficient matrix H of a wireless communication channel between a beamformer and beamformee, the channel coefficient matrix H being a 2×N complex matrix having two rows corresponding to two antenna of the beamformee and N columns corresponding to N antenna of the beamformer, N being a positive integer number greater than or equal to 1;
determine a real symmetric matrix M based on the channel coefficient matrix H, wherein the real symmetric matrix M has only entries of real numbers;
determine eigenvalues and eigenvectors of the real symmetric matrix M;
determine singular vectors of the channel coefficient matrix H based on the eigenvectors and eigenvalues, the singular vectors defining a steering matrix; and
transmit the steering matrix to a beamformer, wherein a beam is steered by the beamformer to the beamformee based on the steering matrix, wherein the processing circuit configured to determine the real symmetric matrix M is based only on orthogonal transformations of the channel coefficient matrix H.

11. The beamformee of claim 10, wherein the processing circuit configured to determine eigenvalues and eigenvectors of the real symmetric matrix M comprises the processing circuit configured to perform a non-iterative eigenvalue decomposition of the real symmetric matrix M.

12. The beamformee of claim 10, wherein the processing circuit configured to determine eigenvalues and eigenvectors of the real symmetric matrix M comprises the processing circuit configured to determine a regularized angle to compute the eigenvectors, the regularized angle based on a real positive monotonic regularization function.

13. The beamformee of claim 12, wherein the processing circuit is configured to determine the regularized angle based on a function of the eigenvalues.

14. The beamformee of claim 10, wherein the processing circuit is further configured to tune an amount of power received at the two antenna of the beamformee-receiver when the channel coefficient matrix H has orthogonal rows based on a matrix Y multiplied with the channel coefficient matrix H, wherein the matrix Y is an 2×2 orthonormal matrix.

15. The beamformee of claim 10, wherein the processing circuit is further configured to reduce a condition number of the real symmetric matrix M.

16. The beamformee of claim 10, wherein the processing circuit is further configured to determine a real upper triangular matrix P based on an upper triangular matrix R, wherein the real symmetric matrix M is based on the real upper triangular matrix P and the upper triangular matrix R.

17. The beamformee of claim 10, wherein the processing circuit is further configured to perform a QR decomposition of a Hermitian transpose of a matrix Z, wherein the matrix Z is based on the channel coefficient matrix H and a matrix Y, the matrix Z degenerates to the channel coefficient matrix H when the matrix Y is an identity matrix, wherein the QR decomposition is a factorization as a product of a matrix Q with orthonormal columns and an upper triangular matrix R with a real positive diagonal; and wherein the processing circuit configured to determine the real symmetric matrix M comprises the processing circuit further configured to determine the real symmetric matrix M based on the upper triangular matrix R.

18. The beamformee of claim 17, wherein the steering matrix is the matrix Q when one or more off diagonal entries of the upper triangular matrix R are less than a threshold amount.

* * * * *